United States Patent [19]

Noguchi

[11] Patent Number: 5,118,352
[45] Date of Patent: Jun. 2, 1992

[54] FLAKY EXTENDER PIGMENT COMPRISING HYDRATED TITANIUM OXIDE LAYERS AND METHOD FOR PREPARING THE SAME

[75] Inventor: Tamio Noguchi, Fukushima, Japan

[73] Assignee: Merck Patent Gesellschaft mit Beschränkter Haftung, Darmstadt, Fed. Rep. of Germany

[21] Appl. No.: 638,037

[22] Filed: Jan. 7, 1991

Related U.S. Application Data

[63] Continuation of Ser. No. 342,775, Apr. 25, 1989, abandoned.

[30] Foreign Application Priority Data

Apr. 26, 1988 [JP] Japan ............................... 63-101388

[51] Int. Cl.⁵ ................. A61K 7/021; C04B 14/02; C04B 14/30; C09C 3/06
[52] U.S. Cl. ............................ 106/436; 106/415; 106/417; 424/63; 427/419.2; 427/419.3; 428/363; 428/403
[58] Field of Search ............ 106/415, 417, 436; 427/419.2, 419.3; 428/363, 403; 424/63

[56] References Cited

U.S. PATENT DOCUMENTS

| | | | |
|---|---|---|---|
| 3,087,828 | 4/1963 | Linton | 106/417 |
| 3,274,013 | 9/1966 | Batt | 106/417 |
| 3,342,617 | 9/1967 | Jackson | 106/415 |
| 3,711,308 | 1/1973 | Brand et al. | 106/417 |
| 4,373,963 | 2/1983 | Uenishi et al. | 106/415 |
| 4,456,486 | 6/1984 | Bernhard | 106/417 |
| 4,552,593 | 11/1985 | Ostertag | 106/436 |

FOREIGN PATENT DOCUMENTS 1268177  3/1972  United Kingdom .

Primary Examiner—A. Lionel Clingman
Assistant Examiner—John Boyd
Attorney, Agent, or Firm—Millen, White & Zelano

[57] ABSTRACT

The invention relates to a flaky extender pigment formed by adsorbing a titanium oxide hydrate having a mean grain size of from 0.1 to 0.5 μm on the surface of a flaky substrate and then further coating a titanium oxide hydrate having a mean grain size of less than 0.1 μm.

18 Claims, No Drawings

000# FLAKY EXTENDER PIGMENT COMPRISING HYDRATED TITANIUM OXIDE LAYERS AND METHOD FOR PREPARING THE SAME

This application is a continuation of application Ser. No. 07/342,775, filed Apr. 25, 1989, now abandoned.

SUMMARY OF THE INVENTION

The present invention relates to a new flaky extender pigment having proper whiteness and brightness and sufficient extendability and adhesiveness to skin, which is suitable as an extender pigment for cosmetics.

Hitherto, a flaky fine powder of kaolin, talc, mica or the like has been used as an extender pigment for make-up cosmetics. However, such powder has neither whiteness which is required for an extender pigment for make-up cosmetics nor satisfactory characteristic for extendability and adhesiveness to skin.

On the other hand, a pearly pigment formed by coating the surface of a mica powder with fine titanium oxide grains has an excellent characteristic in the point of extendibility and adhesiveness to skin and therefore has been used as a coloring material for cosmetics, but since the pigment has too strong a luster, it is not suitable for use as an extender pigment for cosmetics.

The adhesiveness and extendability of a titanium oxide-coated mica and the whiteness of barium sulfate are known and thus a flaky extender pigment with excellent extendibility and adhesiveness based thereon has been developed (Japanese Patent Application (OPI) No. 94463/85). (The term "OPI" as used herein means a "published unexamined Japanese patent application.") As a result of studies of titanium dioxide with respect to the grain size thereof and the luster and color tone of the said extender pigment, the present invention provides a new flaky extender pigment which has a proper whiteness with little luster and which is satisfactory with respect to the extendibility and adhesiveness to skin.

Specifically, in the present invention, the light-scattering from a flaky substrate is strengthened so as to reduce the luster of the pigment and to obtain a proper whiteness thereof. Accordingly, in order to obtain an extender pigment which may satisfy the said requirement and which is free from the said drawbacks, a titanium oxide hydrate or titanium oxide having a mean grain size of from 0.1 to 0.5 μm is scattered on the surface of a flaky substrate, and then the thus-processed substrate is further coated with fine titanium oxide hydrate or titanium oxide grains having a mean grain size of less than 0.1 μm so as to obtain sufficient extendibility and adhesiveness to the skin, whereby a new flaky extender pigment which has a proper whiteness with little luster and which is satisfactory with respect to the extendibility and adhesiveness to skin can be obtained by the present invention.

When the extender pigment obtained by the present invention is applied to cosmetic materials such as a compact cake, the resulting compact cake would not be broken and would be free from color separation, and therefore, a make-up cosmetic material which has satisfactory extendibility and adhesiveness to skin and which may give a healthy skin touch can be prepared.

Accordingly, the subject matter of the present invention resides in a luster-free new flaky extender pigment in which the surface of the flaky substrate is scattered with grains of titanium oxide hydrate or titanium oxide having a mean grain size of about 0.1 to 0.5 μm to form a first layer thereover, for the purpose of strengthening the light-scattering from the surface of the said flaky substrate, and fine grains of titanium oxide hydrate or titanium oxide having a mean grain size of less than about 0.1 μm are further overcoated to form a second layer.

Now, the present invention will be explained in detail hereinafter.

The flaky extender pigment of the present invention is characterized in that the surface of the flaky substrate is scattered with grains of titanium oxide hydrate or titanium oxide having a mean grain size of from 0.1 to 0.5 um and the thus-processed substrate is further coated with fine grains of titanium oxide hydrate or titanium oxide having a mean grain size of less than 0.1 um, and the novel flaky extender pigment of the present invention can be produced in accordance with the following methods (1) to (4).

(1) A method for preparing a flaky extender pigment, in which an aqueous solution containing a titanium compound as dissolved therein is hot-hydrolyzed, i.e. at a temperature of about 50°-100° C., to prepare a titanium oxide hydrate-containing colloid suspension, an aqueous solution containing a flaky substrate as suspended therein is added to the resulting titanium oxide hydrate-containing colloidal suspension with stirring so that the said titanium oxide hydrate colloid is adsorbed on the said flaky substrate, and then an aqueous solution containing a titanium compound as dissolved therein and an aqueous solution containing a basic substance as dissolved therein are gradually added thereto under heat, i.e. at a temperature of about 40°-90° C., so that the resulting fine titanium oxide hydrate grains are coated on the colloid-adsorbed substrate.

(2) A method for preparing a flaky extender pigment, in which an aqueous solution containing a titanium compound as dissolved therein is hot-hydrolyzed to prepare a titanium oxide hydrate-containing colloid suspension, an aqueous solution containing a flaky substrate as suspended therein is added to the resulting titanium oxide hydrate-containing colloidal suspension with stirring so that the said titanium oxide hydrate colloid is adsorbed on the said flaky substrate, and then an aqueous solution containing a titanium compound as dissolved therein and an aqueous solution containing a basic substance as dissolved therein are gradually added thereto under heat so that the resulting fine titanium oxide hydrate grains are coated on the colloid-adsorbed substrate, and thereafter the flaky extender pigment thus obtained is fired so that the titanium oxide hydrate is converted into a titanium oxide.

(3) A method for preparing a flaky extender pigment, in which an aqueous solution containing a titanium compound as dissolved therein and an aqueous solution containing a basic substance as dissolved therein are blended and heated to form a titanium oxide hydrate colloid suspension, an aqueous solution containing a flaky substrate as suspended therein is added to the said titanium oxide hydrate colloid suspension with stirring so that the said titanium oxide hydrate colloid is adsorbed on the flaky substrate, and then an aqueous solution containing a titanium compound as dissolved therein and an aqueous solution containing a basic substance as dissolved therein are gradually added thereto under heat so as to form a flaky extender pigment coated with fine titanium oxide hydrate grains.

(4) A method for preparing a flaky extender pigment, in which an aqueous solution containing a titanium compound dissolved therein and an aqueous solution containing a basic substance as dissolved therein are blended and heated to form a titanium oxide hydrate and the grains of the said titanium oxide hydrate are grown to prepare a titanium oxide hydrate colloidal suspension, an aqueous solution containing a flaky substrate as suspended therein is added to the said titanium oxide hydrate colloid suspension with stirring so that the said titanium oxide hydrate colloid is adsorbed on the flaky substrate, and then an aqueous solution containing a titanium compound as dissolved therein and an aqueous solution containing a basic substance as dissolved therein are gradually added thereto under heat so that the fine titanium oxide hydrate grains are coated on the colloid-adsorbed substrate, and thereafter the flaky extender pigment thus obtained is fired so that the titanium oxide hydrate is converted into a titanium oxide.

Accordingly, the present invention further provides the above-mentioned methods (1) to (4) as novel methods for producing the flaky extender pigments of the present invention.

As the titanium compound to be used in the above-mentioned methods, titanium tetrachloride, titanium oxysulfate and the like may be mentioned as suitable for industrial use, but other titanium compounds and organic titanates can also be used. As the basic substance to be used in the above-mentioned methods, there may be mentioned amines, amides, alkali metal and ammonium hydroxides and carbonates, e.g., sodium hydroxide, potassium hydroxide, sodium carbonate, potassium carbonate, ammonium carbonate, as well as urea and acetamide.

As the flaky substrate to which the titanium oxide hydrate colloid formed is to be adsorbed and coated, there are, for example, mica such as muscovite, sericite, synthetic fluorine-containing phologopite, and talc, as well as kaolin and other clays. Generally acceptable are any inert, flaky substrates having a mean grain size of about 1 to 150 μm. Specific reaction parameters and pigment characteristics such as percent by weight of the titanium in each layer, thickness of the layers, the amounts and/or relative proportions of oxides and bases in the preparation solutions, times, temperatures, pH, stirring, firing parameters, solvents, etc., are preferably those given in the following embodiments correlated with each method.

One embodiment of the above-mentioned method (1) comprises the following steps:

(1-a) An aqueous solution containing from 10 to 30 parts of a 20% to 40 wt. % titanium compound as dissolved in 100 parts of water is heated up to 50° to 95° C. and stirred to prepare a titanium oxide hydrate-containing colloidal suspension.

(1-b) From 30 to 60 parts of a fine flaky powder having a grain size of from 1 to 150 μm, preferably from 1 to 50 μm, are suspended in about 150 parts of water, and an aqueous solution containing from 20 to 40% by weight of a basic substance as dissolved therein is added thereto and the pH value of the resulting suspension is adjusted to be from 9 to 12, preferably from 10 to 11.

(1-c) The suspension obtained in the above-mentioned step (1-b) is added to the titanium oxide hydrate-containing colloidal suspension obtained in the above-mentioned step (1-a) gradually with stirring, whereupon the temperature of the reaction system is maintained to be from 40° to 90° C. After the complete addition, the whole is continuously stirred for further 30 to 60 minutes.

(1-d) Next, from 100 to 400 parts of an aqueous solution containing from 20 to 40% by weight of a titanium compound as dissolved therein and an aqueous solution containing from 20 to 40% by weight of a basic substance as dissolved therein are added to the resulting suspension, with stirring at an addition flow speed of from 0.05 to 1.0 part/min, whereupon the pH value of the suspension is kept to be from 0.2 to 2.5, preferably from 0.5 to 2.0, and the temperature thereof is kept to be 40° to 90° C. The solid product is filtered and washed with water, and then dried at 105° to 120° C. The product thus obtained is a flaky extender pigment, and the amount of the titanium oxide hydrate of the first layer being contained in the flaky pigment is from 2 to 15% by weight, preferably from 5 to 12% by weight, and the amount of the titanium oxide hydrate of the second layer is from 3 to 45% by weight, preferably from 15 to 35% by weight.

One embodiment of the above-mentioned method (2) is as mentioned below.

The flaky extender pigment obtained by the method (1) is fired at 600° C. to 1,000° C., to give a titanium dioxide-coated flaky extender pigment. Alternatively, when the pigment obtained by the method (1) is fired at 200° C. to 600° C., a flaky pigment coated with a mixture of titanium oxide hydrate and titanium dioxide is formed.

One embodiment of the above-mentioned method (3) comprises the following steps:

(3-a) From 3 to 7 parts of an aqueous solution containing from 20 to 40% by weight of a titanium compound as dissolved therein and from 2 to 8 parts of an aqueous solution containing from 20 to 40 % by weight of a basic substance as dissolved therein are added at the same time to 100 parts of water as heated at 40° C. to 90° C. and blended, whereupon the pH value of the reaction solution is kept to be from 0.5 to 2.0, preferably from 1.5 to 2.0. The addition flow speed of the aqueous titanium compound solution and the aqueous basic substance solution is adjusted to be from 0.05 to 0.5 part/min, preferably from 0.1 to 0.2 part/min, and thus a titanium oxide hydrate colloid is formed.

(3-b) In the same manner as the above-mentioned step (1-b), an aqueous suspension containing a flaky substrate is prepared.

(3-c) The suspension obtained in the above-mentioned step (3-b) is added to the titanium oxide hydrate-containing colloidal suspension obtained in the above-mentioned step (3-a) gradually with stirring, in the same manner as the above-mentioned step (1-c).

(3-d) The same step as the above-mentioned step (1-d) is carried out.

As one embodiment of the above-mentioned method (4), the flaky extender pigment obtained by the method (3) is fired in the same manner as the above-mentioned step (2), whereby a flaky extender pigment as coated with titanium dioxide can be obtained.

It was ascertained by electron-microscopic observation that the pigments obtained by the above-mentioned methods have a structural texture that a flaky substrate is coated with a titanium oxide hydrate or titanium dioxide having a mean grain size of from 0.1 to 0.5 μm and further overcoated with a titanium oxide hydrate or titanium dioxide having a mean grain size of less than 0.1 μm.

It was further ascertained that the pigments thus obtained by the present invention have proper whiteness and transparency as well as satisfactory extendibility and adhesiveness to skin and therefore are far superior to any other conventional pigments as an extender pigment for cosmetics.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire texts of all applications, patents and publications, if any, cited above and below, and of corresponding application Japanese No. 63-101388, filed Apr. 26, 1988, are hereby incorporated by reference.

EXAMPLES

Example 1

(a) One liter of water was heated up to 70° C. and 50 ml of an aqueous 30 wt. % titanium tetrachloride solution was added thereto at a flow speed of 1.4 ml/min, while the pH value of the resulting solution was being adjusted to 1.5 to 2.2 with an aqueous 30 wt. % sodium hydroxide solution, to form a titanium hydroxide colloid.

Next, 45 g of muscovite mica having a grain size of from 1 to 15 $\mu$m was suspended in 150 ml of water and the pH value of the resulting suspension was adjusted to 10 to 11 with an aqueous 30 wt. % sodium hydroxide solution. Then the suspension was added to the said titanium oxide colloid over a period of 15 minutes.

After the addition of the mica-containing suspension, the whole was stirred for 50 minutes, and 250 ml of an aqueous 30 wt. % titanium tetrachloride solution was added thereto at a flow speed of 1.0 ml/min, while the pH value was being adjusted to 1.5 to 2.2 with an aqueous 30 wt. % sodium hydroxide solution. After the addition of the aqueous titanium tetrachloride solution, the pH value of the resulting suspension was adjusted to 5.0 with an aqueous 30 wt. % sodium hydroxide solution.

The product formed was precipitated, filtered and washed with water to remove salts therefrom, and then dried at about 105° to 110° C. for 15 hours to obtain a white pigment in which the mica was coated with fine titanium oxide hydrate grains. The pigment had satisfactory extendibility and adhesiveness.

(b) The pigment obtained in the above (1) was fired at 700° C. for 1 hour to obtain a white pigment in which the mica was coated with fine titanium oxide grains. The pigment also had satisfactory extendibility and adhesiveness.

Example 2

(a) 100 g of an aqueous 30 wt. % titanium oxysulfate solution wad added to 500 g of water, heated up to 75° C. and stirred for 30 minutes to form a titanium oxide hydrate colloid. Next, 90 g of muscovite mica having a grain size of from 1 to 15 $\mu$m was suspended in 100 ml of water and, after the pH value of the resulting suspension was adjusted to 10 to 11 with an aqueous 30 wt. % sodium hydroxide solution, the suspension was added to the said titanium oxide hydrate colloid over a period of 25 minutes. After the addition of the mica suspension, the resulting suspension was heated up from 75° to 90° C. over a period of 20 minutes, and 200 ml of an aqueous 30 wt. % titanyl sulfate solution was added thereto at a flow speed of 5 ml/min, with stirring. After the addition of the aqueous titanyl sulfate solution, an aqueous 30 wt. % potassium hydroxide solution was added thereto at a flow speed of 3 ml/min so that the pH value of the resulting suspension was adjusted to 5.5.

The product formed was precipitated, filtered and washed with water to remove salts therefrom, and then dried at about 105° to 110° C. for 8 hours to obtain a white pigment in which the mica was coated with fine titanium oxide hydrate grains. The pigment had satisfactory extendibility and adhesiveness.

(b) The white pigment obtained in the above (a) was fired at 700° C. for 1 hour to obtain a white pigment in which the pica was coated with fine titanium oxide grains. The pigment also had satisfactory extendibility and adhesiveness.

Example 3

(a) 100 g of an aqueous 30 wt. % titanium oxysulfate solution and 20 g of urea were added to 500 g of water, heated up to 85° C. and stirred for 30 minutes to form a titanium oxide hydrate colloid. Next, 90 g of muscovite mica having a grain size of from 1 to 15 $\mu$m was suspended in 120 ml of water, and after the pH value of the resulting suspension was adjusted to 10 to 11 with an aqueous 30 wt. % sodium hydroxide solution, the suspension was added to the said titanium oxide hydrate colloid over a period of 20 minutes. After the addition of the mica suspension, 200 ml of an aqueous 30 wt. % titanyl sulfate solution was added thereto at a flow speed of 5 ml/min. After the addition of the aqueous titanyl sulfate solution, an aqueous 30 wt. % potassium hydroxide solution was added thereto at a flow speed of 3 ml/min so that the pH value of the resulting suspension was adjusted to 5.5.

The product formed was precipitated, filtered and washed with water to remove salts therefrom, and then dried at about 105° to 110° C. for 8 hours to obtain a white pigment in which the mica was coated with fine titanium oxide hydrate grains. The pigment had satisfactory extendibility and adhesiveness.

(b) The white pigment obtained in the above (a) was fired at 700° C. for 1 hour to obtain a white pigment in which the mica was coated with fine titanium oxide grains. The pigment also had satisfactory extendibility and adhesiveness.

Example 4

The same process of Example 1(a) and (b) was repeated except that muscovite mica having a grain size of from 5 to 25 $\mu$m was used in place of the muscovite mica having a grain size of from 1 to 15 $\mu$m used in Example 1, and a white pigment having satisfactory extendibility and adhesiveness was obtained.

Example 5

The same process of Example 1(a) and (b) was repeated except that muscovite mica having a grain size of from 10 to 60 $\mu$m was used in place of the muscovite mica having a grain size of from 1 to 15 $\mu$m used in Example 1, and a white pigment having satisfactory extendibility and adhesiveness was obtained.

Example 6

The same process of Example 1(a) and (b) was repeated except that sericite having a grain size of from 1 to 30 μm was used in place of the mica used in Example 1, and a white pigment having satisfactory extendibility and adhesiveness was obtained.

Example 7

The same process of Example 1(a) and (b) was repeated except that talc having a grain size of 20 μm or less was used in place of the mica used in Example 1, and a white pigment having satisfactory extendibility and adhesiveness was obtained.

Example 8

The same process of Example 1(a) and (b) was repeated except that fluoro-phologopite having a grain size of from 1 to 50 μm was used in place of the mica used in Example 1, and a white pigment having satisfactory extendibility and adhesiveness was obtained.

Example 9

A compact powder comprising the following components was prepared.

| | |
|---|---|
| Extender Pigment Obtained in Example 1 | 75 g |
| Color Pigment | 5 g |
| Hydrous Lanolin | 3 g |
| Isopropyl Myristate | 3 g |
| Magnesium Stearate | 2 g |
| Corn Starch | 12 g |

The compact powder thus obtained was excellent in the extendibility and adhesiveness and also was extremely excellent in the smoothness, soft touch and color tone.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A flaky pigment useful as an extender comprising a flaky substrate, a first layer of hydrated titanium oxide having a mean grain size of about 0.1 to 0.5 μm and a second layer of hydrated titanium oxide having a mean grain size of less than 0.1 μm, said first layer being produced by adsorbing previously prepared titanium oxide onto the substrate.

2. A flaky pigment extender comprising a flaky substrate, a first layer of titanium oxide having a mean grain size of about 0.1 to 0.5 μm and a second layer of titanium dioxide having a mean grain size of less than 0.1 μm, said first layer being produced by adsorbing previously prepared titanium oxide onto the substrate.

3. A flaky pigment extender comprising a flaky substrate, a first layer of partly hydrated titanium dioxide having a mean grain size of about 0.1 to 0.5 μm and a second layer of partly hydrated titanium dioxide having a mean grain size of less than 0.1 μm, said first layer being produced by adsorbing previously prepared titanium oxide onto the substrate.

4. In a cosmetic formulation comprising a pigment, a pigment extender and a cosmetically acceptable carrier, the improvement wherein the pigment extender is one of claim 1.

5. In a cosmetic formulation comprising a pigment, a pigment extender and a cosmetically acceptable carrier, the improvement wherein the pigment extender is one of claim 2.

6. A cosmetic formulation according to claim 4, wherein the pigment extender has a whiteness suitable for use with colored pigments and a skin adhesion suitable for use in cosmetics.

7. A pigment extender according to claim 1, wherein the substrate is mica, talc or kaolin.

8. A pigment according to claim 7, wherein the substrate is muscovite, sericite, or synthetic fluorine-containing phologopite.

9. A pigment according to claim 7, wherein the substrate has a mean grain size of about 1-150 μm.

10. In a method of preparation of a flaky pigment extender which extender comprises a flaky substrate, a first layer of hydrated titanium oxide having a mean grain size of about 0.1 to 0.5 μm and a second layer of hydrated titanium oxide having a mean grain size of less than 0.1 μm, said pigment extender having a whiteness and skin adhesion suitable for use with colored pigments in cosmetic formulations, the step comprising preparing a titanium oxide hydrate containing colloidal suspension and adding thereto a suspension of a flaky powder substrate having a grain size of about 1-150 μm, whereby a first layer of titanium oxide hydrate is adsorbed thereon.

11. A method according to claim 10, wherein subsequent to adsorption of the titanium oxide hydrate, an aqueous solution of a titanium compound and an aqueous solution of a base are added, whereby a second layer of hydrated titanium oxide is precipitated onto the substrate so as to obtain a pigment extender.

12. A method according to claim 11, wherein the pigment extender is fired to produce a product wherein the layers are partly converted to titanium dioxide.

13. A method according to claim 11, wherein the pigment extender is fired to produce a product wherein the first and second layers are converted to titanium dioxide.

14. A method according to claim 10, wherein the colloidal suspension is prepared by hot-hydrolyzing an aqueous solution of a titanium compound.

15. A method according to claim 10, wherein the substrate is added simultaneously with an aqueous solution of a base.

16. A pigment prepared by the process of claim 11.

17. A pigment prepared by the process of claim 12.

18. A pigment prepared by the process of claim 13.

* * * * *